No. 749,853. Patented January 19, 1904.

UNITED STATES PATENT OFFICE.

JAMES ESTEP, OF TACOMA, WASHINGTON, ASSIGNOR OF ONE-HALF TO ROBERT L. BLOOM, OF LAKEVIEW, WASHINGTON.

PROCESS OF MAKING BUTTER.

SPECIFICATION forming part of Letters Patent No. 749,853, dated January 19, 1904.

Application filed December 22, 1902. Serial No. 136,293. (No specimens.)

*To all whom it may concern:*

Be it known that I, JAMES ESTEP, a citizen of the United States, residing at Tacoma, in the county of Pierce and State of Washington, have invented a new and useful Improvement in Processes of Making Butter, of which the following is a specification.

This invention relates to the treating of milk with the herein-described substances, whereby butter may be made direct from sweet cream, and has for its objects the production of a greater quantity of butter from a given quantity of cream in less time and with less labor, and the butter thus produced will be free from disagreeable flavor resulting from foul weeds, decayed roots, garlic, willows, &c., eaten by cows and may by the exercise of proper care be kept indefinitely without spoiling.

In the process of making butter as practiced at the present date the cream is allowed to ripen before churning, and in this ripening process a certain proportion of the fat-globules burst, and the fat is irretrievably lost, thus reducing the efficiency of the process in the very beginning. After the cream is ripened it is churned, the buttermilk is drawn off, and the butter is washed in cold water, salted, and worked.

I have found that by the introduction into the cream before it is churned of the following-described prescription it may be churned while yet sweet, and the butter produced will have the taste and qualities of good ordinary butter without, however, the property of spoiling readily.

My prescription is: take one ounce of scale-pepsin pulverized, five ounces of sugar of milk, six ounces of alum pulverized, and six ounces of saltpeter pulverized. Mix these thoroughly together and use one teaspoonful for each gallon of sweet cream or one-half teaspoonful for each gallon of sour cream. The pepsin which I prefer to use is that taken from the lining of the stomach of the pig, and its strength should be such that it will dissolve or digest about three thousand times its own weight.

The details of my process of preparing the cream for churning are as follows: The temperature of the cream should be about 62° in cold weather and as cold as 54° in warm weather if possible. This cream at its proper temperature and while still sweet is placed in the churn, and the proper amount of my prescription is then put into the cream. Churn the cream until butter is formed in granules about the size of a grain of wheat. Then draw off the buttermilk and wash the butter granules twice with an amount of water approximately equal to the amount of buttermilk drawn off, the temperature of this washing-water corresponding with that of the cream, as above indicated. Then salt and work the butter.

The action of the various ingredients of my prescription on the individual globules of the butter while in their free state I conceive to be as follows: The alum stiffens the globule and prevents its breaking and losing the fat into the buttermilk. The pepsin and sugar of milk then digest or absorb all fleshy and foreign matter from the surface of the globule, freeing it from the materials which cause it to have an unwholesome and disagreeable taste, as when the cow has been eating decayed roots, garlic, &c. The saltpeter destroys the microbes. These ingredients, with other impurities, are removed by the washing-out after the churning.

I find that by using my process and comparing it with the process in use at present that I can produce on an average an extra half-pound of butter to every gallon of cream, and the time taken for the churning is only about one-half that ordinarily taken at present.

What I claim as my invention, and desire to secure by Letters Patent, is—

1. The process of preparing cream and milk for the manufacture of butter, consisting in subjecting the cream, before churning, to the actions of alum, pepsin, sugar of milk and saltpeter substantially as and for the purpose described.

2. The process of the manufacture of butter consisting in subjecting sweet cream to the actions of alum, pepsin, sugar of milk and saltpeter, churning said cream, removing the buttermilk, washing out said alum, pepsin, sugar of milk and saltpeter with other impurities, salting and working the butter.

In testimony whereof I have signed my name to this specification in the presence of two subscribing witnesses.

JAMES ESTEP.

Witnesses:
 GEO. W. FOWLER,
 ADELAIDE FRAZIER.